Oct. 27, 1931.  E. PETERSEN  1,829,056
CAMPING DEVICE FOR MOTOR VEHICLES
Filed May 17, 1928  2 Sheets-Sheet 1
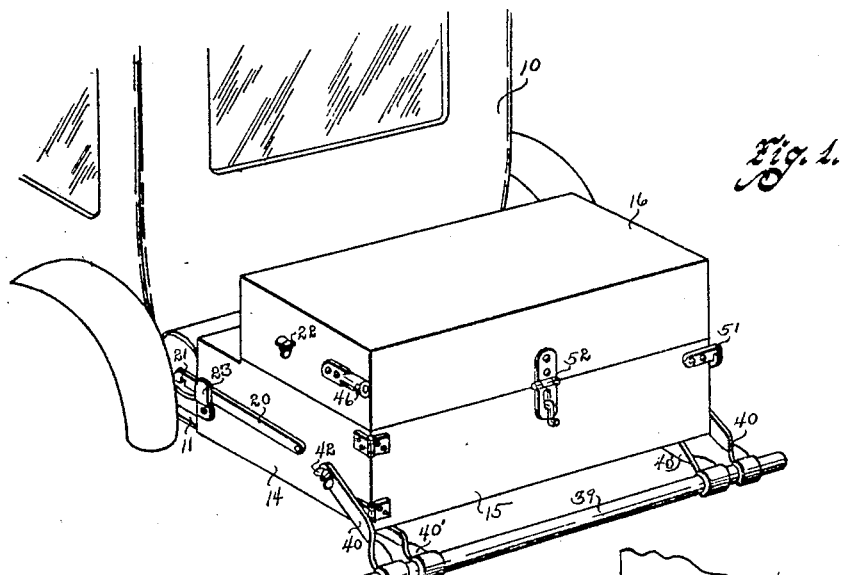
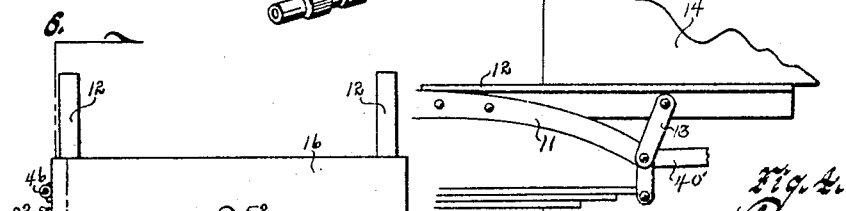
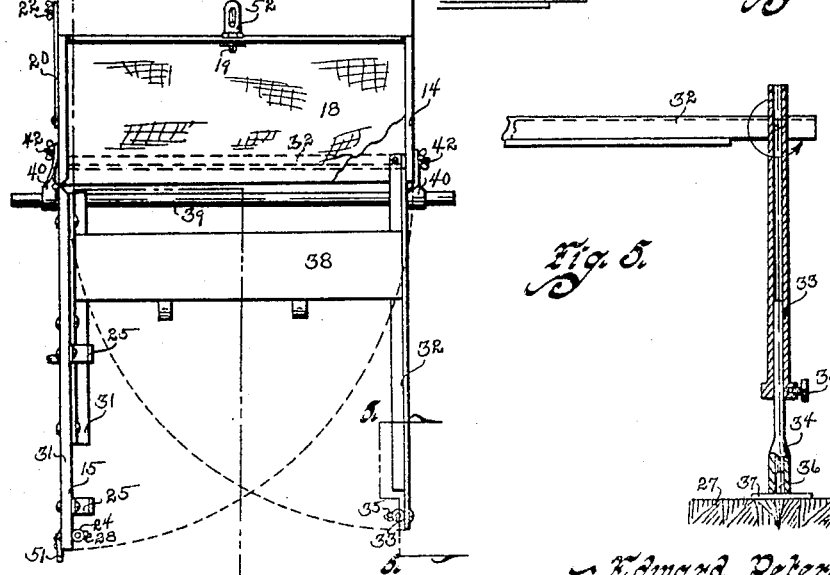
Inventor
Edward Petersen
By M. Talbert Dick
Attorney Oct. 27, 1931.   E. PETERSEN   1,829,056
CAMPING DEVICE FOR MOTOR VEHICLES
Filed May 17, 1928   2 Sheets-Sheet 2
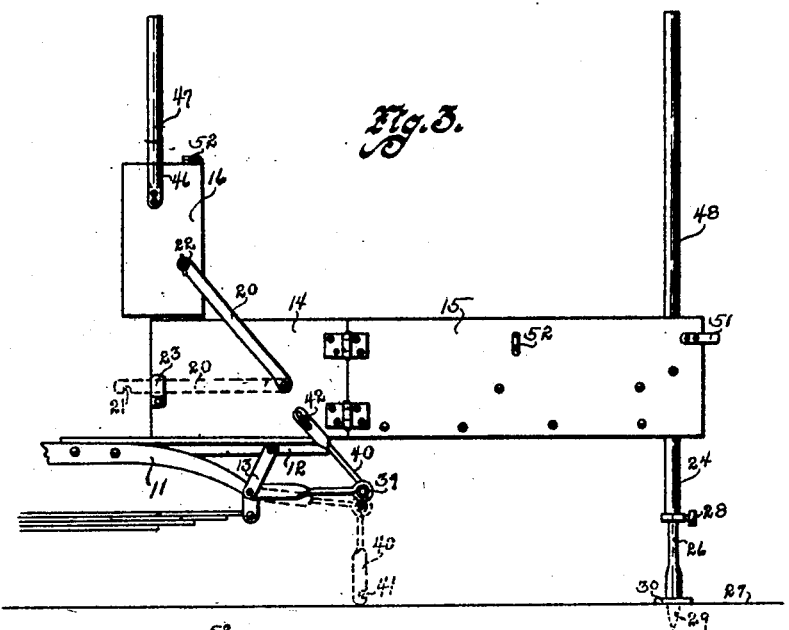
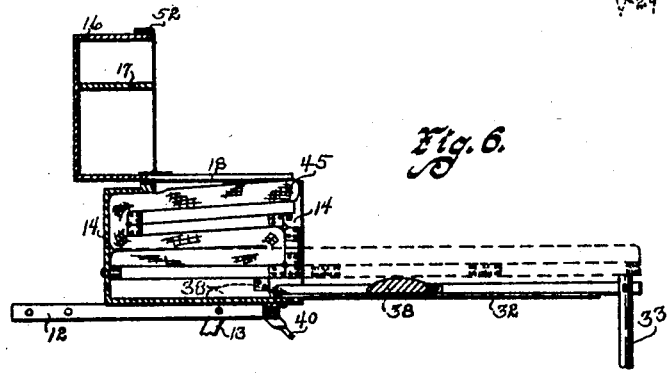
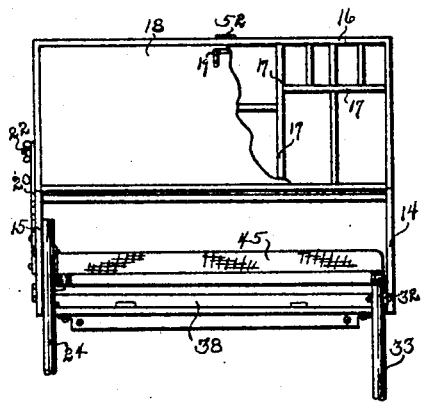
Inventor
Edward Petersen
By M. Talbert Dick
Attorney Patented Oct. 27, 1931

1,829,056

UNITED STATES PATENT OFFICE

EDWARD PETERSEN, OF DES MOINES, IOWA

CAMPING DEVICE FOR MOTOR VEHICLES

Application filed May 17, 1928. Serial No. 278,410.

The principal object of this invention is to provide a combined bed, kitchen cabinet, table and bench that is capable of being folded or condensed into a trunk designed to be secured to the rear end of a tourist's automobile.

A still further object of this invention is to provide a combined bed, kitchen cabinet, table and bench for campers that is easily and quickly placed in an operative position, and as easily and readily folded up into a trunk.

A still further object of this invention is to provide a combined bed, kitchen cabinet, table and bench for tourist's vehicles that requires a very small place when not in use, utilizes no space inside the automobile, and is easily attached or detached to any car.

A still further object of this invention is to provide a combined bed, kitchen cabinet, table and bench capable of folding out from a trunk secured to the rear end of a vehicle that may be easily adjusted to compensate for the unevenness of the ground over which the device is to be used.

A still further object of this invention is to provide a combined bed, kitchen cabinet, table and bench for vehicles that provides a rear bumper for the vehicle and may be used as a vertical support for holding up a tent.

These and other objects will be apparent to those skilled in the art.

My invention consists in the construction, arrangement and combination of the various parts of the device, whereby the objects contemplated are attained as hereinafter more fully set forth pointed out in my claims and illustrated in the accompanying drawings, in which:

Fig. 1 is a perspective view of my invention folded into a trunk which is secured to the rear end of an automobile or like.

Fig. 2 is a top plan view showing the upper portion of the trunk folded back to provide a table, kitchen cabinet, and bench.

Fig. 3 is a side view of the invention secured to a vehicle and in an unfolded position.

Fig. 4 is a side sectional view of a portion of the trunk that receives the various parts, and illustrates the manner in which the same is secured to the rear end of a vehicle.

Fig. 5 is a side sectional view of one of the supporting legs of the device and is taken on line 5—5 of Fig. 2.

Fig. 6 is a side sectional view of the kitchen cabinet, table and bench in operation and is taken on line 6—6 of Fig. 2.

Fig. 7 is an end view of the invention with the folding bed in an extended position.

Fig. 8 is an end sectional view of a portion of the device and more fully illustrates the manner in which the folding bed rests upon one of the supporting legs.

One of the chief objections to traveling by automobile is the lack of sleeping and eating accommodations. When a bed, and eating accommodations are carried in the automobile there is little room left for the passengers. I have overcome these disadvantages as will be appreciated by those skilled in the art.

I have used the numeral 10 to designate the ordinary automobile having the two rear springs 11. Secured by suitable means to each of these springs is a supporting beam 12 extending to the rear as shown in Fig. 3. The numeral 13 designates a brace member between the end of each spring and the beam secured to it. It is upon these beams that the trunk portion of my device is designed to be secured and supported, much as the ordinary rear trunk for vehicles. My trunk consists of a lower compartment 14 having its rear side enclosed by a hinged door 15 capable of swinging open in a horizontal plane. Hinged on the top of the compartment 14 is the top compartment which I have designated by the numeral 16. This top compartment encloses the top opening in the lower compartment, when the same is resting in a closed position on the lower compartment. The top compartment is capable of swinging upwardly and toward the vehicle to a position shown in Fig. 3 and Fig. 6. This open position without engaging the rear end of the vehicle is made possible by the top container being of less width than the width of the lower container. In the upper container is shelving 17 for holding eating facilities. The lower or open end of the top container is enclosed by a hinged door 18 and when the top compartment is in an open position and this door is allowed to open and rest on the lower compartment, a table is created as shown in Fig. 2. When the door is closed the kitchen cabinet in the upper compartment will be enclosed. This door 18 is secured in a closed condition by the catch member 19.

The upper compartment may be securely held in an open position by the arm 20 pivoted at one end to the lower compartment and its other end having the notch 21 capable of engaging the bolt 22 on the upper compartment. By screwing up the butter-fly nut on this bolt the arm can not be detached from the upper compartment. To detach the arm from the bolt 22 it is merely necessary to loosen the nut and lift the free end of the arm upwardly. When not in use the arm may rest on the bracket member 23 secured to the side of the lower compartment as shown by the dotted lines in Fig. 3.

To obtain a seat or bench in front of the table portion the door 15 is swung to an open position shown in Fig. 2, and the supporting leg 24 pivoted to the end of the door is swung to a downward position from its inoperative position on the bracket members 25 secured on the inner side of the door 15. This leg is hollow and has slidably mounted therein the foot member 26 designed to engage the ground 27. The foot member may be adjusted longitudinally and is secured in any desired position by the thumb-screw 28 threaded into the leg member thereby making it possible to compensate for various ground levels. Detachably secured in the free end of the foot member is a spike 29 designed to engage the ground and prevent the same from slipping. The numeral 30 designates a plate member secured to the spike to prevent the same from sinking into the ground beyond a certain distance. Secured by suitable means to the inner side of the door 15 is an angle iron 31. The numeral 32 designates an angle iron horizontally pivoted to the inner side of the lower compartment opposite the side the door 15 is hinged on. This last angle iron is swung out to a position parallel with the door 15 when the same is in an open position.

Pivoted to the free end of the angle iron is a supporting leg 33 designed to be swung from its inoperative position in the angle iron to a downward position. This swinging action is made possible by a portion of the angle iron cut away at its free end. This supporting leg is similar to the supporting leg 24 pivoted to the door 15, and has the foot member 34 longitudinally adjustable and capable of being secured in any desired position by the thumb screw 35 threaded into the leg 33. This foot member also has the spike 36 and the plate member 37 secured thereon. When the door 15 and the angle iron 32 are in extended positions the seat 38 may be removed from its inoperative position in the bottom of the lower compartment and placed on the angle irons 31 and 32 as shown in Fig. 2, thereby providing a seat or bench in front of the table board 18. Pivotally secured to each of the springs 11 is an arm 40' carrying the bumper 39. Pivoted on each end portion of this bumper rod 39 is an arm 40. Each of these arms have a notch 41 near their free ends and are designed to engage a bolt 42 on each side of the lower container respectively. By screwing down the butter-fly nut on each bolt the arms 42 the bumper will be securely held in an operative position as shown in Fig. 1. By loosening the nuts on the bolts 42 the arms may be lifted out of engagement with the bolts 42 and the bumper will swing downwardly thereby providing a foot rest while setting on the seat 38.

When a bed is desired, the board 18 is raised to enclose the kitchen cabinet portion and the ordinary folding bed which I have designated by the numeral 45 is unfolded from the lower compartment and allowed to rest on the angle irons 31 and 32 as shown in Fig. 6. This folding bed when in the lower compartment in folded condition occupies the upper portion of the same.

Secured to the upper compartment 16 is a short pipe member 46 designed to receive the rod 47. The numeral 48 designates a second rod designed to extend into the top of the supporting leg hinged to the door 15. If it is desired these rods may be used as tent supports and when such is the case the bed, kitchen cabinet, and table will be protected from the weather and may be used in comfort regardless of the same. The detachable parts of the device may be stored in the bottom of the lower compartment. To prevent the bed from creeping when in use on its frame, I have provided a lug 50 on the bed frame capable of entering and engaging the top of the supporting leg pivoted to the angle iron 32 as shown in Fig. 8.

The complete device may be folded into the trunk portion in a moments time. The door 15 is held in a closed position by the catch member 51 and the upper compartment may be secured in a closed position on the lower compartment by the catch member 52.

Some changes may be made in construction and arrangement of my improved camping device for motor vehicles without departing from the real spirit and purpose of my invention and it is my intention to cover by my claims any modified forms of structure or use of mechanical equivalents which may be reasonably included within their scope.

I claim:

1. A trunk designed to be secured to the rear end of a vehicle, a hinged door in one side of said trunk, an angle iron pivoted to the end of said trunk, a leg secured to said door for supporting the same when in an operating position, a leg secured to said angle iron for supporting it when it is in an extended position, and a folding bed in said trunk and capable of being unfolded and supported upon said door and said angle iron.

2. A trunk designed to be secured to the rear springs of a vehicle, and having its side open furthest from said springs, a vertcally hinged door for enclosing said opening, an angle iron hinged on the inner end of said trunk opposite the side the door is hinged on and capable of swinging out from an inoperative position inside said trunk to a position parallel with said door when the same is not in an open position, a means for supporting the free ends of said door and angle iron, a bed designed to be supported upon said door and angle iron when in an operative position and to be folded into said trunk when not in use, and a means for preventing said bed from creeping relative to said door and angle iron in use.

3. In a device of the class described, a trunk having two compartments and designed to be secured to the rear end of an automobile, a folding bed in said trunk when not in use, a door hinged to said trunk capable of horizontal swinging movement, a supporting leg having one end pivoted to the outer end of said door and capable of being swung to an inoperative position on the inner side of said door, an angle iron having one end pivoted to said trunk capable of horizontal swinging movement, a supporting leg having one end pivoted to the outer end of said angle iron and capable of being swung to an inoperative position on said angle iron, said door and angle iron supporting said bed when in extended position, and a catch member for holding said angle iron and door in a closed position.

4. In a device of the class described, a trunk having an upper and a lower compartment, designed to be secured to the rear end of an automobile, a bed in said lower compartment when not in use, a door hinged to said lower compartment capable of horizontal swinging movement, an angle iron secured to the inner side of said door, a longitudinally adjustable supporting leg secured to the free end of said door, an angle iron pivoted to said lower compartment and capable of horizontal swinging movement, a longitudinally adjustable supporting leg secured to the free end of said angle iron hinged to said compartment, a spike secured on the lower end of each of said supporting legs designed to engage the ground, a plate member secured to each of said spikes for preventing the same from going into the ground beyond a certain distance, said bed being supported on said angle irons, when in use, and a door for enclosing said upper compartment.

5. In a device of the class described, a trunk comprising an upper and lower compartment; said upper compartment being open at its bottom and hinged on said lower compartment, a hinge door for closing said upper compartment, a door hinged to said lower compartment, an angle iron secured on the inner side of said last mentioned door, an angle iron pivoted at one end to said lower compartment, a folding bed designed to fold into said lower compartment when not in use and being supported on said angle irons when in use, and a catch member for securing said upper and lower compartments in a closed position when not in use.

6. In a device of the class described, a trunk having a hinged compartment on its top and designed to be secured to an automobile, a hinged door for inclosing the upper hinged compartment and capable of resting on the trunk when in an open position a door hinged to said lower compartment, a leg for supporting said last mentioned door when in an open position, an angle iron pivoted to said trunk, a leg secured to said angle iron for supporting the same when in an extended position and a folding bed designed to fold into said lower compartment when not in use and being supported on said last mentioned door and angle iron when in use.

EDWARD PETERSEN.